United States Patent
Lee et al.

(10) Patent No.: US 10,342,035 B2
(45) Date of Patent: Jul. 2, 2019

(54) METHOD FOR REPORTING A BUFFER STATUS AND DEVICE THEREFOR

(71) Applicant: LG Electronics Inc., Seoul (KR)

(72) Inventors: Sunyoung Lee, Seoul (KR); Seungjune Yi, Seoul (KR); Sungjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 11 days.

(21) Appl. No.: 15/038,912

(22) PCT Filed: Dec. 9, 2014

(86) PCT No.: PCT/KR2014/012060
§ 371 (c)(1),
(2) Date: May 24, 2016

(87) PCT Pub. No.: WO2015/099321
PCT Pub. Date: Jul. 2, 2015

(65) Prior Publication Data
US 2016/0381595 A1 Dec. 29, 2016

Related U.S. Application Data

(60) Provisional application No. 61/920,770, filed on Dec. 25, 2013.

(51) Int. Cl.
*H04W 72/12* (2009.01)
*H04W 72/04* (2009.01)
(Continued)

(52) U.S. Cl.
CPC ... *H04W 72/1284* (2013.01); *H04W 28/0278* (2013.01); *H04W 72/0406* (2013.01); *H04W 72/1278* (2013.01); *H04W 80/02* (2013.01)

(58) Field of Classification Search
CPC ......... H04W 72/1284; H04W 72/1278; H04W 72/0406; H04W 28/0278; H04W 80/02
See application file for complete search history.

(56) References Cited

U.S. PATENT DOCUMENTS

2009/0052388 A1   2/2009  Kim et al.
2011/0292873 A1   12/2011 Guo
(Continued)

FOREIGN PATENT DOCUMENTS

WO   WO 2014161168 A1 * 10/2014   ........ H04W 72/1252

OTHER PUBLICATIONS

NSN, Nokia Corporation: "BSR and SR for dual connectivity", 3GPP TSG-RAN WG2 Meeting #84, R2-133855, Nov. 11-15, 2013.
(Continued)

*Primary Examiner* — Kwang B Yao
*Assistant Examiner* — Moo Jeong
(74) *Attorney, Agent, or Firm* — Dentons US LLP

(57) ABSTRACT

The present invention relates to a wireless communication system. More specifically, the present invention relates to a method and a device for reporting a buffer status in the wireless communication system, the method comprising: generating a MAC PDU (Protocol Data Unit) including first BSR MAC CE (Buffer Status Reporting MAC Control Element) for an amount of data to be transmitted via the first MAC entity; and transmitting the MAC PDU via the second MAC entity to a base station.

10 Claims, 14 Drawing Sheets

(51) Int. Cl.
*H04W 28/02* (2009.01)
*H04W 80/02* (2009.01)

(56) References Cited

U.S. PATENT DOCUMENTS

| | | |
|---|---|---|
| 2013/0188570 A1 | 7/2013 | Zhao et al. |
| 2015/0117241 A1* | 4/2015 | Koc ................. H04W 36/0055 370/252 |
| 2016/0234714 A1* | 8/2016 | Basu Mallick ..... H04W 28/085 |

OTHER PUBLICATIONS

Qualcomm Incorporated: "BSR considerations for dual connectivity with bearer splitting", 3GPP TSG-RAN WG2 Meeting #84, R2-133997, Nov. 11-15, 2013.

* cited by examiner (a) Control-Plane Protocol Stack (b) User-Plane Protocol Stack

| Group index₁ | R | R | R | R | Oct 1 |
| LCG ID₁ | Buffer Size₁ ||||  Oct 2 |
| Group index₂ | R | R | R | R | Oct 3 |
| LCG ID₂ | Buffer Size₂ |||| Oct 4 |
| ⋮ |||||
| Group index_N | R | R | R | R | Oct 2N-1 |
| LCG ID_N | Buffer Size_N |||| Oct 2N |

METHOD FOR REPORTING A BUFFER STATUS AND DEVICE THEREFOR

This application is a 35 USC § 371 National Stage entry of International Application No. PCT/KR2014/012060 filed on Dec. 9, 2014, and claims priority to U.S. Provisional Application No. 61/920,770 filed on Dec. 25, 2013, all of which are hereby incorporated by reference in their entireties as if fully set forth herein.

TECHNICAL FIELD

The present invention relates to a wireless communication system and, more particularly, to a method for reporting a buffer status and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for a method for reporting a buffer status in the UE comprising 2 differently MAC entity. The technical problems solved by the present invention are not limited to the above technical problems and those skilled in the art may understand other technical problems from the following description.

Technical Solution

The object of the present invention can be achieved by providing a method for operating by an apparatus in wireless communication system, the method comprising; the method comprising: configuring a plurality of logical channel sets comprising a first logical channel set transmitting data to the first BS and a second logical channel set transmitting data to the second BS, wherein the first and the second logical channel sets respectively comprise one or more logical channels; receiving data for a first logical channel belonging to the first logical channel set; and triggering a buffer status reporting to the first BS, if the first logical channel has highest priority among logical channels for which data are available for transmission in the first logical channel set.

In another aspect of the present invention provided herein is an apparatus in the wireless communication system, the apparatus comprising: an RF (radio frequency) module; and a processor configured to control the RF module, wherein the processor is configured to configure a plurality of logical channel sets comprising a first logical channel set transmitting data to the first BS and a second logical channel set transmitting data to the second BS, wherein the first and the second logical channel sets respectively comprise one or more logical channels, to receive data for a first logical channel belonging to the first logical channel set, and to trigger a buffer status reporting to the first BS, if the first logical channel has highest priority among logical channels for which data are available for transmission in the first logical channel set.

Preferably, wherein the first logical channel has lower priority than a second logical channel belonging to the second logical channel set.

Preferably, the method further comprises: transmitting the buffer status reporting to the first BS when uplink data becomes available for transmission for the first BS.

Preferably, wherein the first logical channel set comprises one or more logical channel groups, and the first logical channel has highest priority among the logical channels which belong to one of the logical channel groups in the first logical channel set and for which the data are available for transmission.

It is to be understood that both the foregoing general description and the following detailed description of the present invention are exemplary and explanatory and are intended to provide further explanation of the invention as claimed.

Advantageous Effects

According to the present invention, reporting a buffer status can be efficiently performed in a wireless communication system. Specifically, the UE can report amount of data available for transmission to a base station if the UE is connected two different MAC entity.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
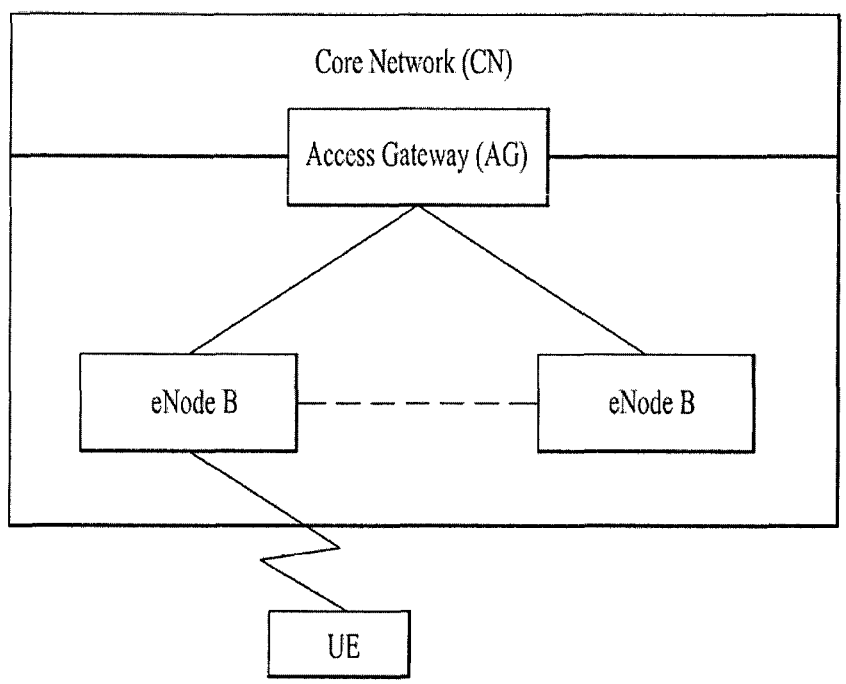
FIG. 1 is a diagram showing a network structure of an Evolved Universal Mobile Telecommunications System (E-UMTS) as an example of a wireless communication system.
Figure 2A:
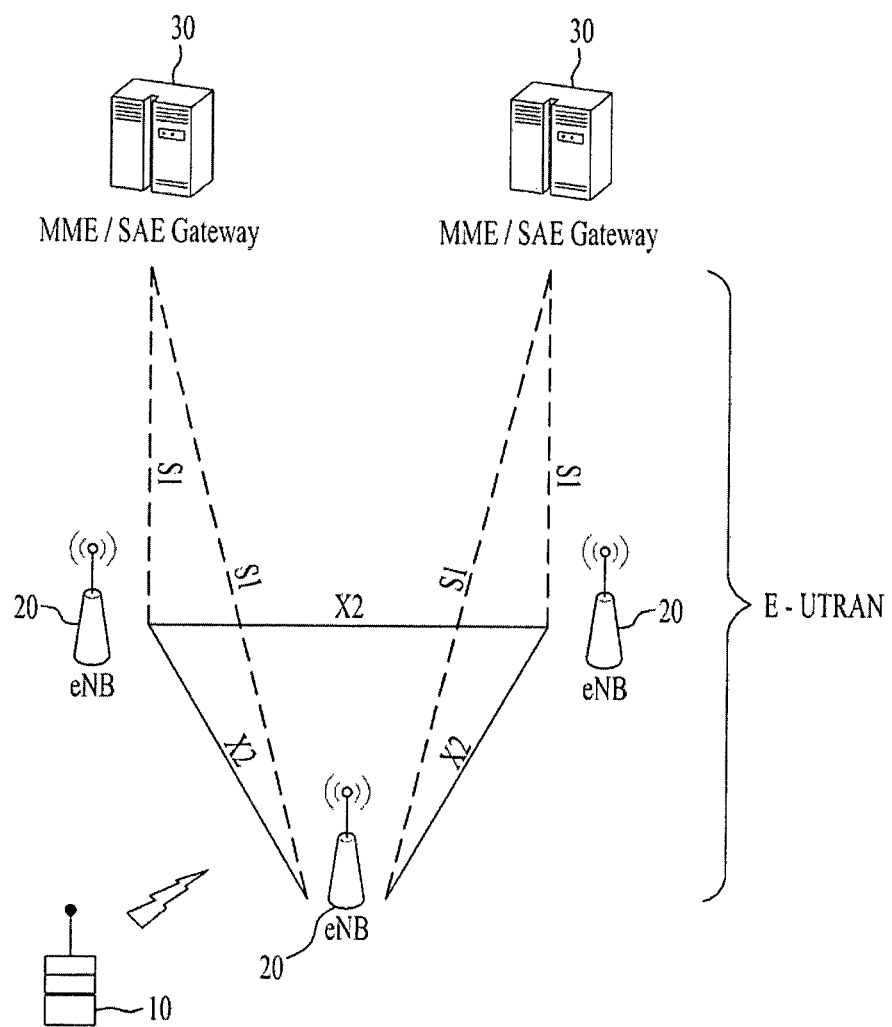
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
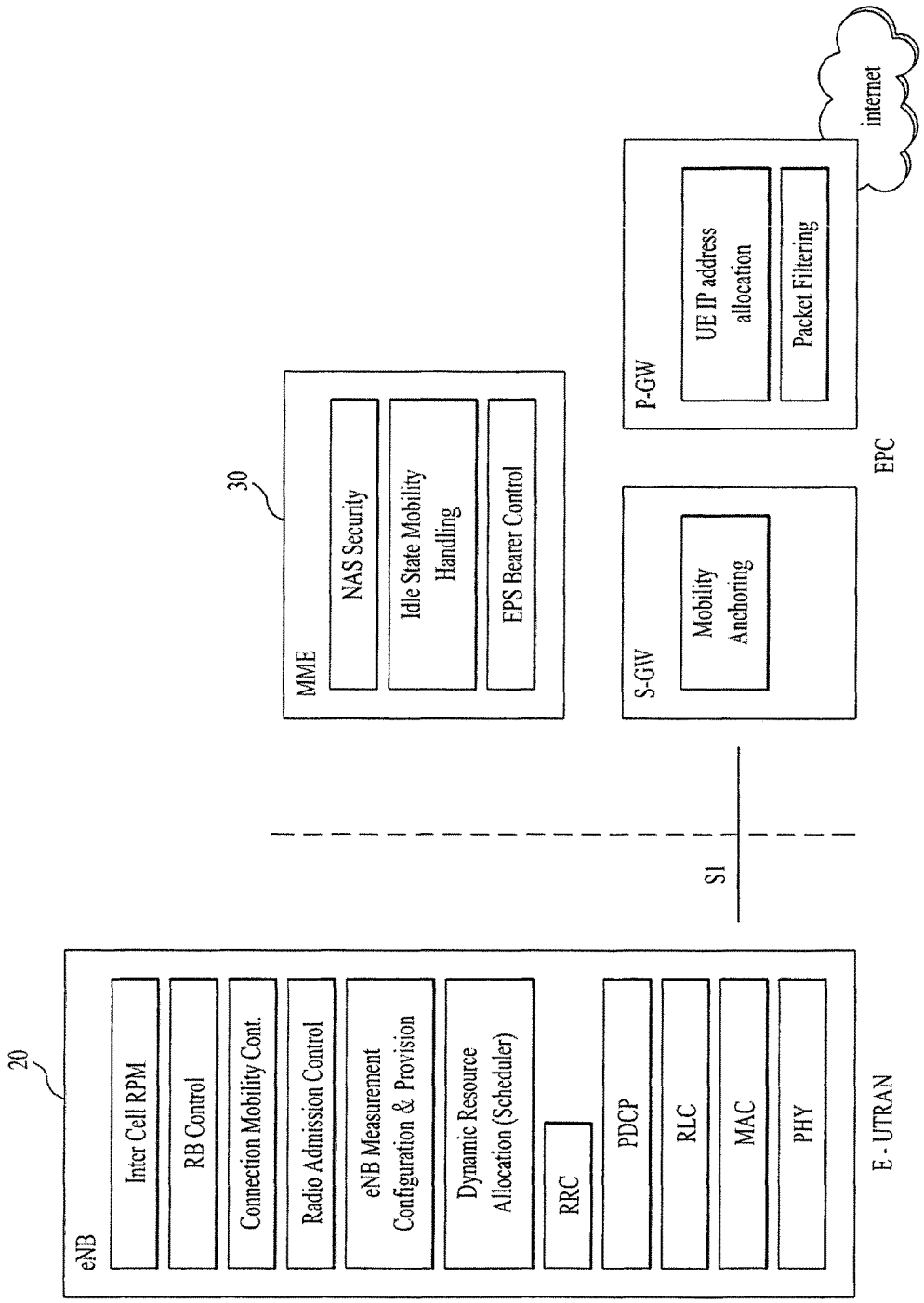
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
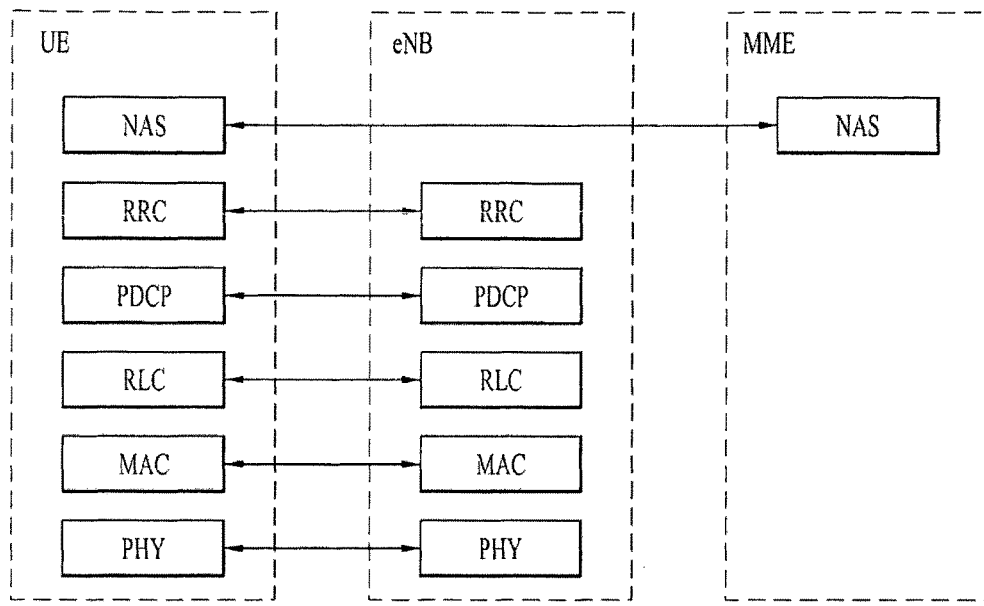
FIG. 3 is a diagram showing a control plane and a user plane of a radio interface protocol between a UE and an E-UTRAN based on a 3rd generation partnership project (3GPP) radio access network standard.
Figure 3:
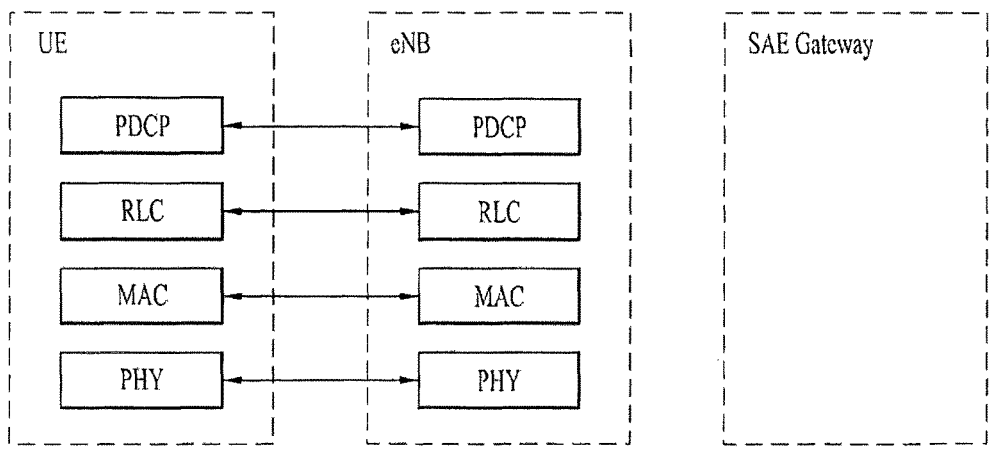

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
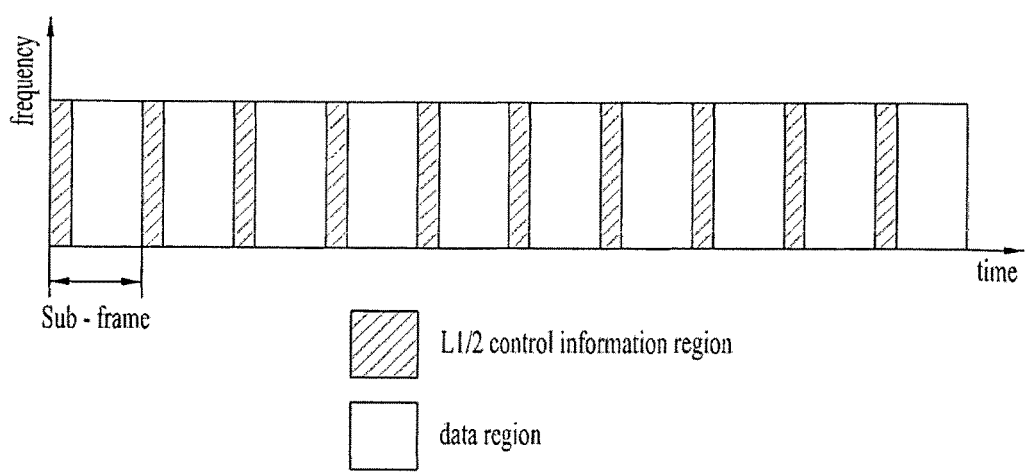
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
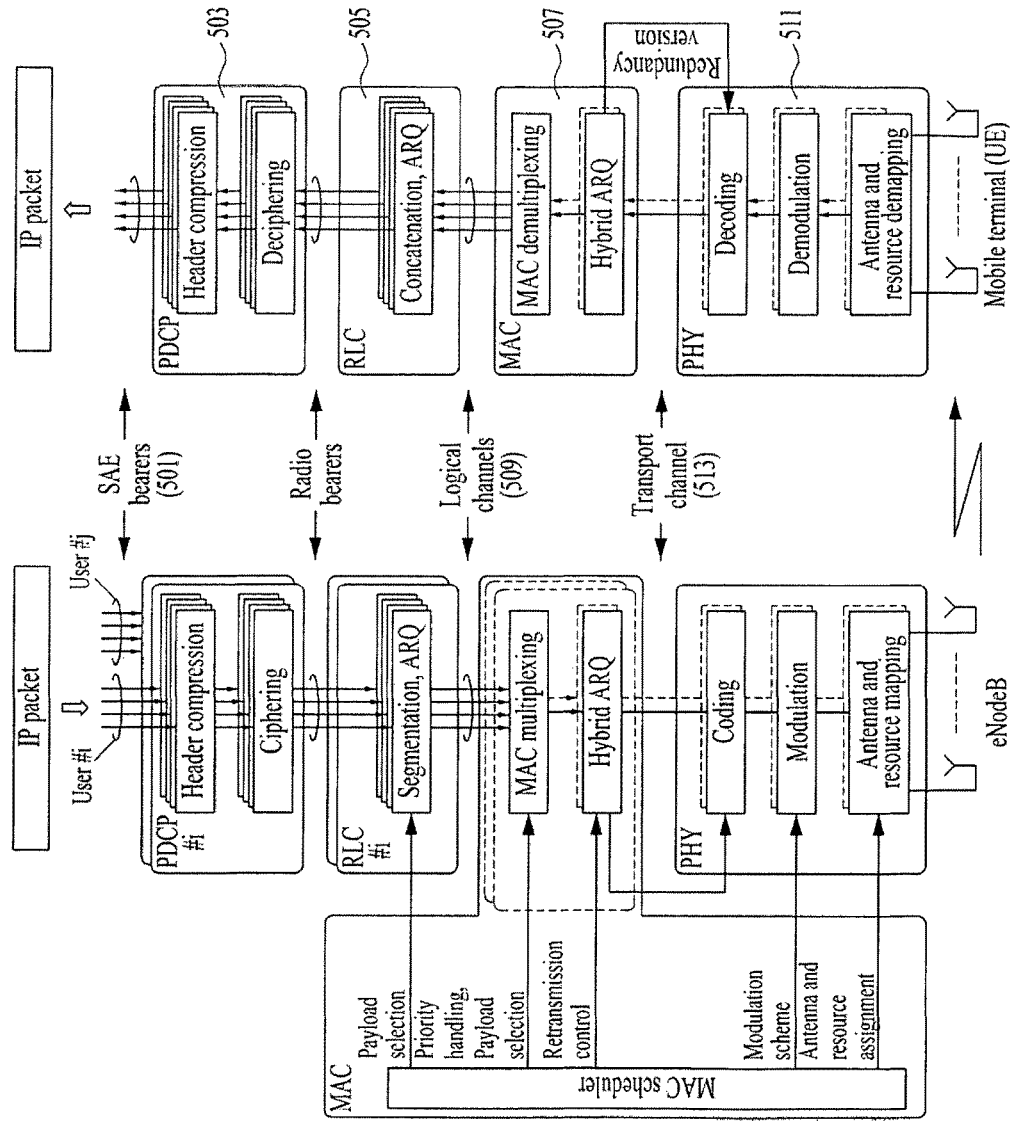
FIG. 5 is a diagram for a general overview of the LTE protocol architecture for the downlink.

FIG. 5 is a diagram for a general overview of the LTE protocol architecture for the downlink.

A general overview of the LTE protocol architecture for the downlink is illustrated in FIG. 5. Furthermore, the LTE protocol structure related to uplink transmissions is similar to the downlink structure in FIG. 5, although there are differences with respect to transport format selection and multi-antenna transmission.

Data to be transmitted in the downlink enters in the form of IP packets on one of the SAE bearers (501). Prior to transmission over the radio interface, incoming IP packets are passed through multiple protocol entities, summarized below and described in more detail in the following sections:

Packet Data Convergence Protocol (PDCP, 503) performs IP header compression to reduce the number of bits necessary to transmit over the radio interface. The header-compression mechanism is based on ROHC, a standardized header-compression algorithm used in WCDMA as well as several other mobile-communication standards. PDCP (503) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 505) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (505) offers services to the PDCP (503) in the form of radio bearers. There is one RLC entity per radio bearer configured for a terminal.

Medium Access Control (MAC,507) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (507) offers services to the RLC (505) in the form of logical channels (509).

Physical Layer (PHY, 511), handles coding/decoding, modulation/demodulation, multi-antenna mapping, and other typical physical layer functions. The physical layer (511) offers services to the MAC layer (507) in the form of transport channels (513).

The MAC (507) offers services to the RLC (505) in the form of logical channels (509). A logical channel (509) is defined by the type of information it carries and are generally classified into control channels, used for transmission of control and configuration information necessary for operating an LTE system, and traffic channels, used for the user data.

Figure 6:
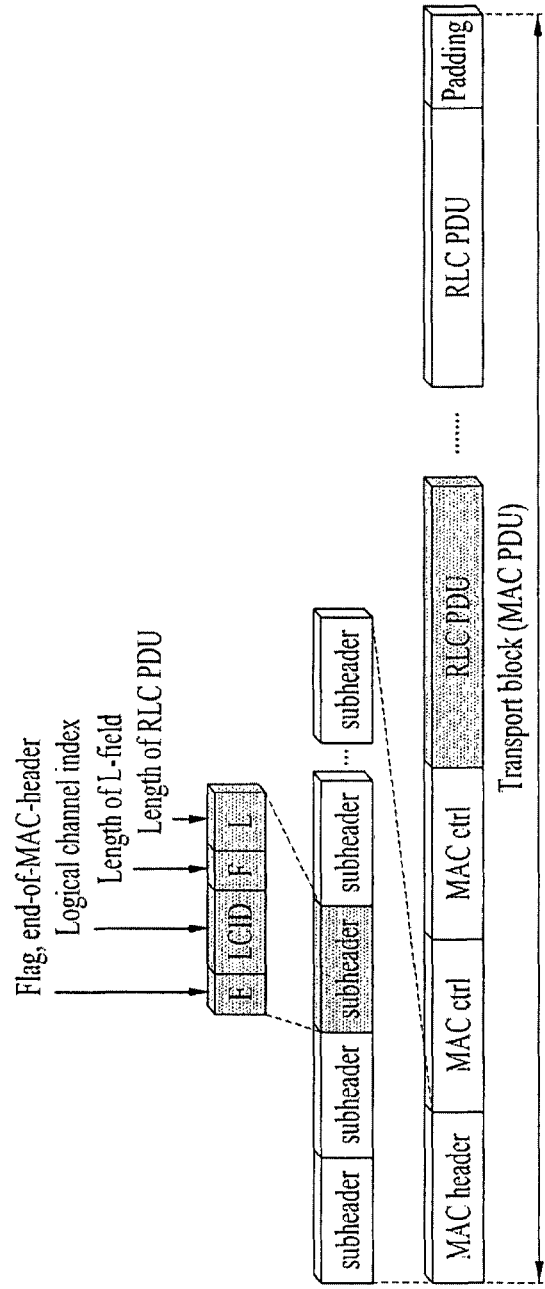
FIG. 6 is a diagram for MAC header and SDU (Service Data Unit) multiplexing.

FIG. 6 is a diagram for MAC header and SDU (Service Data Unit) multiplexing.

The MAC layer handles logical-channel multiplexing, hybrid-ARQ retransmissions, and uplink and downlink scheduling. It is also responsible for multiplexing/demultiplexing data across multiple component carriers when carrier aggregation is used.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC header, shown in FIG. 6, is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information.

Furthermore, the length field in the sub-header is removed for control elements with a fixed length.

Generally, one UE has a radio bearer comprising one PDCP entity, one RLC entity and one MAC entity. The MAC entity is performed for a base station with which the radio bearer is connected. However, there are cases that one UE has two different MAC entities sometimes (i.e. Dual Connectivity, Pro-Se, etc.).

Figure 7:
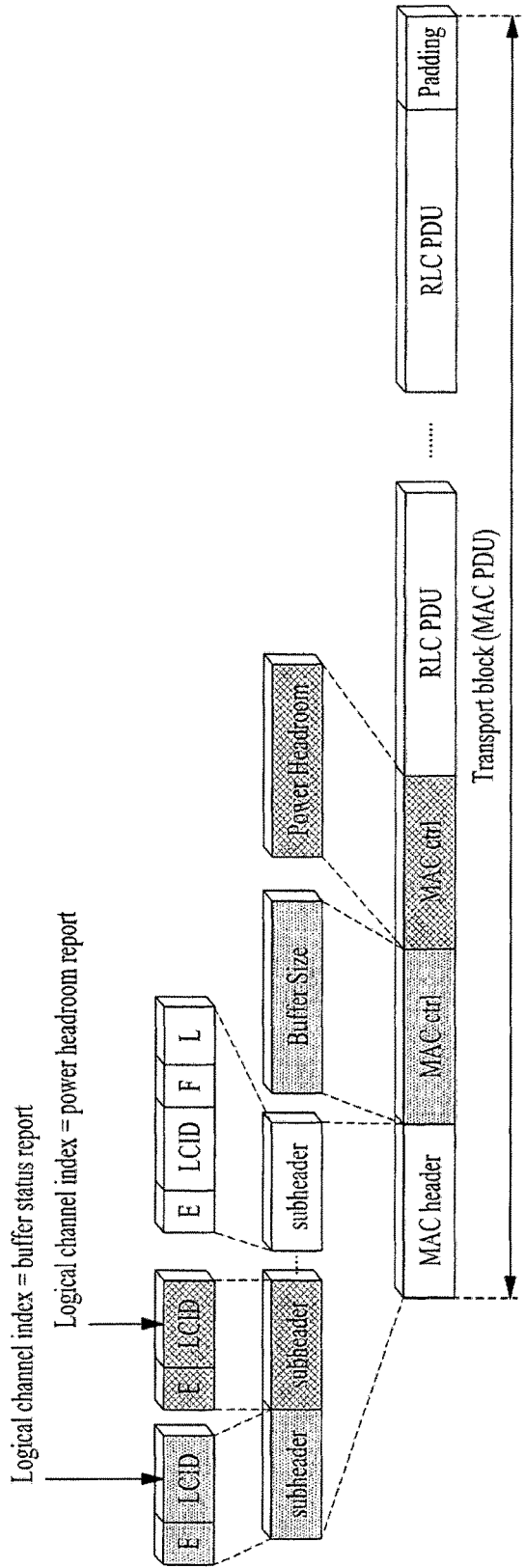
FIG. 7 is a diagram for signaling of buffer status and power-headroom report.

FIG. 7 is a diagram for signaling of buffer status and power-headroom reports.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

The use of a single bit for the scheduling request is motivated by the desire to keep the uplink overhead small, as a multi-bit scheduling request would come at a higher cost. A consequence of the single bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 7.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data awaiting transmission across all logical channels in a logical-channel group. A buffer status report represents one or all four logical-channel groups and can be triggered for the following reasons:

i) Arrival of data with higher priority than currently in the transmission buffer—that is, data in a logical-channel group with higher priority than the one currently being transmitted—as this may impact the scheduling decision.

ii) Change of serving cell, in which case a buffer-status report is useful to provide the new serving cell with information about the situation in the terminal.

iii) Periodically as controlled by a timer.

iv) Instead of padding. If the amount of padding required to match the scheduled transport block size is larger than a buffer-status report, a buffer-status report is inserted. Clearly it is better to exploit the available payload for useful scheduling information instead of padding if possible.

Figure 8:
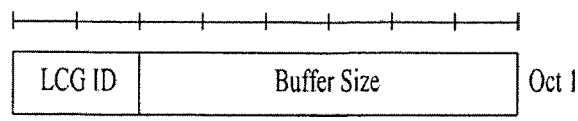
FIG. 8 is a diagram for short BSR MAC CE (Buffer Status Reporting MAC Control CE)
Figure 9:
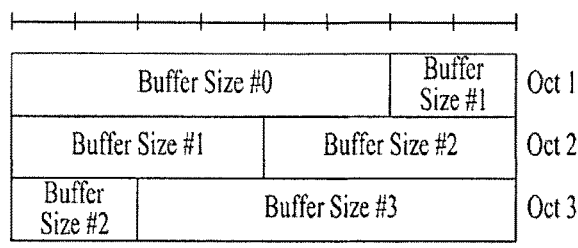
FIG. 9 is a diagram for long BSR MAC CE.

FIG. 8 is a diagram for short BSR MAC CE, and FIG. 9 is a diagram for long BSR MAC CE.

The Buffer Status Reporting (BSR) procedure is used to provide a serving eNB with information about the amount of data available for transmission (DAT) in the UL buffers of the UE. RRC may control BSR reporting by configuring the two timers periodicBSR-Timer and retxBSR-Timer and by, for each logical channel, optionally signalling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

Buffer Status Report (BSR) MAC control elements consist of either: i) Short BSR and Truncated BSR format: one LCG ID field and one corresponding Buffer Size field (FIG. 8) or ii) Long BSR format: four Buffer Size fields, corresponding to LCG IDs #0 through #3 (FIG. 9).

The BSR formats are identified by MAC PDU subheaders with LCIDs as specified in Table 1.

TABLE 1

| Index | LCID values |
| --- | --- |
| 00000 | CCCH |
| 00001-01010 | Identity of the logical channel |
| 01011-10110 | Reserved |
| 10111 | ProSe Truncated BSR |
| 11000 | ProSe BSR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

The fields LCG ID and Buffer Size are defined as follow:

LCG ID: The Logical Channel Group ID field identifies the group of logical channel(s) which buffer status is being reported. The length of the field is 2 bits;

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission. The size of the RLC and MAC headers are not considered in the buffer size computation. The length of this field is 6 bits. If extendedBSR-Sizes is not configured, the values taken by the Buffer Size field are shown in Table 2. If extendedBSR-Sizes is configured, the values taken by the Buffer Size field are shown in Table 3.

TABLE 2

| Index | Buffer Size (BS) value [bytes] |
| --- | --- |
| 0 | BS = 0 |
| 1 | 0 < BS <= 10 |

TABLE 2-continued

| Index | Buffer Size (BS) value [bytes] |
|---|---|
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 3

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |

TABLE 3-continued

| Index | Buffer Size (BS) value [bytes] |
|---|---|
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

Figure 10:
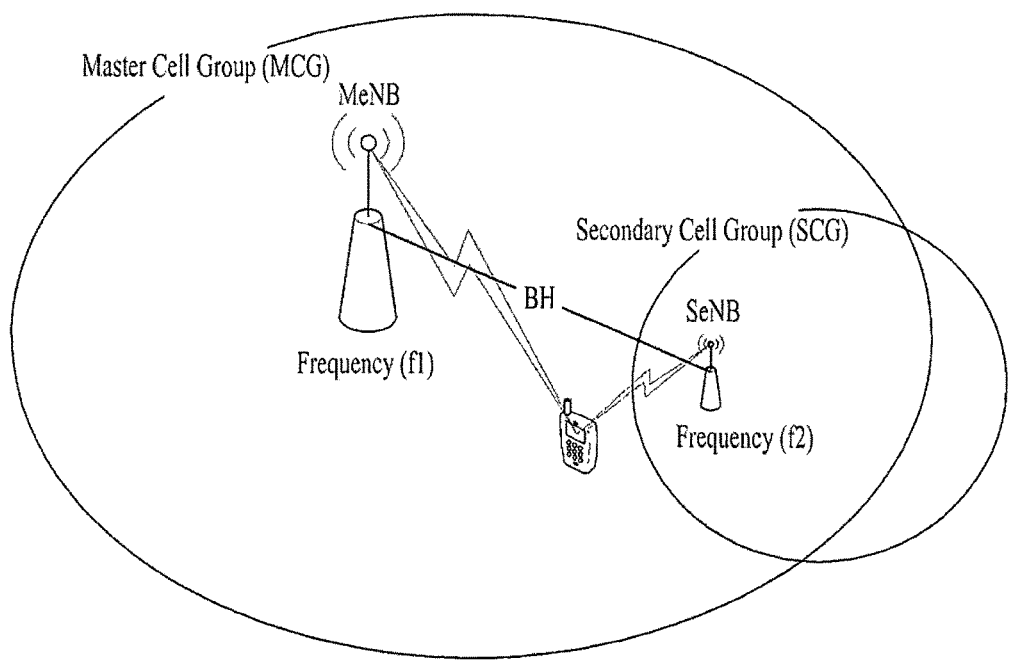
FIG. 10 is a conceptual diagram for dual connectivity between a Master Cell Group (MCG) and a Secondary Cell Group (SCG)

FIG. 10 is a conceptual diagram for dual connectivity between a Master Cell Group (MCG) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs)

or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

In the Dual Connectivity system, the buffer status reporting procedure is used to provide the serving eNB with information about the amount of data available for transmission in the UL buffers associated with the MAC entity. For the buffer status reporting procedure, the MAC entity may consider all radio bearer which are not suspended and may consider radio bearers which are suspended. In this case, buffer status reporting is performed as MAC entity unit. Thus, the each MAC entity operates independently.

Figures 11, 12:
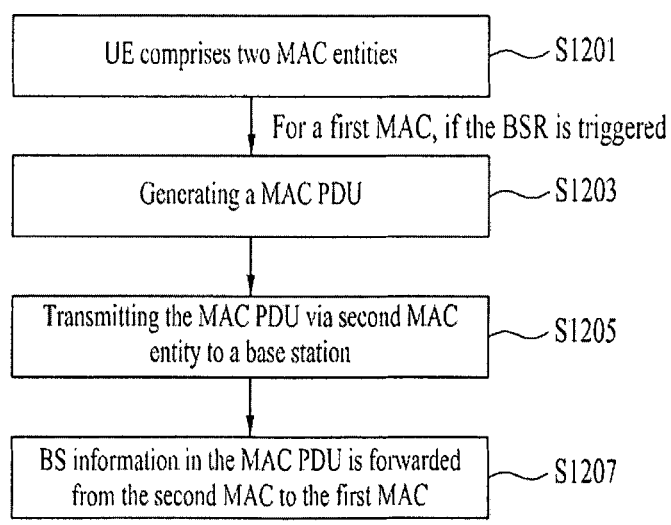
FIG. 11 is a diagram for ProSe (Proximity-based Services) BSR MAC control element.
FIG. 12 is a conceptual diagram for reporting buffer status according to embodiments of the present invention.

FIG. 11 is a diagram for ProSe BSR MAC control element.

A Proximity-based Service (ProSe) communication is a communication system for two devices directly. When two UEs (e.g., UE1, UE2) are in close proximity communicated with each other, their data path (user plane) may go via the network (EPC Path). In particular, if wireless devices (e.g., UE1, UE2) are in proximity of each other, they may be able to use a direct mode data path or a locally routed data path. In the direct mode data path, wireless devices are connected directly each other (after appropriate procedure(s), such as a ProSe Discovery, an authentication), without eNB and SGW/PGW. In the locally routed data path, wireless devices under the coverage of the same eNB are connected to each other through the eNB (after appropriate procedure(s), such as a ProSe Discovery, an authentication).

The data path between the two UEs is called as a sidelink. The MAC entity is responsible for mapping the sidelink logical channels to sidelink transport channels. The sidelink is a link of UE to UE interface for ProSe direct communication and ProSe Direct Discovery. The sidelink corresponds to the PC5 interface.

The sidelink (SL) Buffer Status reporting procedure is used to provide the serving eNB with information about the amount of sidelink data available for transmission in the SL buffers of the UE. RRC controls sidelink BSR reporting by configuring the two timers (i.e. ProSe-periodicBSR-Timer and ProSe-retxBSR-Timer) and by, for each sidelink logical channel, optionally signalling logicalChannelGroup which allocates the logical channel to an LCG.

A sidelink Buffer Status Report (BSR) shall be triggered if any of the following events occur:
  SL data, for a sidelink logical channel which belongs to an LCG, becomes available for transmission in the RLC entity or in the PDCP entity and either the data belongs to a sidelink logical channel with higher priority than the priorities of the sidelink logical channels which belong to any LCG and for which data is already available for transmission, or there is no data available for transmission for any of the sidelink logical channels which belong to an LCG, in which case the BSR is referred below to as "Regular ProSe BSR";
  UL resources are allocated and number of padding bits remaining after a potential Padding BSR has been triggered is equal to or larger than the size of the ProSe Buffer Status Report MAC control element containing the buffer status for at least one sidelink logical channel group plus its subheader, in which case the ProSe BSR is referred below to as "Padding ProSe BSR";
  ProSe-retxBSR-Timer expires and the UE has data available for transmission for any of the sidelink logical channels which belong to an LCG, in which case the BSR is referred below to as "Regular ProSe BSR";
  ProSe-periodicBSR-Timer expires, in which case the BSR is referred below to as "Periodic ProSe BSR";
  A valid SL-RNTI is configured by higher layers and SL data is available for transmission in the RLC entity or in the PDCP entity, in which case the BSR is referred below to as "Regular ProSe BSR".

For Regular and Periodic ProSe BSR, if the number of bits in the UL grant is greater than the size of a ProSe BSR containing buffer status for all LCGs having data available for transmission, the UE reports ProSe BSR containing buffer status for all LCGs having data available for transmission. Else, the UE reports Truncated ProSe BSR containing buffer status for as many LCGs having data available for transmission as possible, in decreasing order of priority, taking the number of bits in the UL grant into consideration.

For Padding ProSe BSR, if the number of padding bits remaining after a potential Padding BSR has been triggered is greater than the size of a ProSe BSR containing buffer status for all LCGs having data available for transmission, the UE reports ProSe BSR containing buffer status for all LCGs having data available for transmission. Else, the UE reports Truncated ProSe BSR containing buffer status for as many LCGs having data available for transmission as possible, in decreasing order of priority, taking the number of bits in the UL grant into consideration.

A MAC PDU may contain at most one ProSe BSR MAC control element, even when multiple events trigger a ProSe BSR by the time a ProSe BSR can be transmitted in which case the Regular ProSe BSR and the Periodic ProSe BSR shall have precedence over the padding ProSe BSR. The UE may restart ProSe-retxBSR-Timer upon indication of a grant for transmission of new data on any SL-SCH.

All triggered ProSe BSRs shall be cancelled in case the SL grant(s) in this subframe can accommodate all pending data available for transmission but is not sufficient to additionally accommodate the ProSe BSR MAC control element plus its subheader. All triggered ProSe BSRs shall be cancelled when a ProSe BSR is included in a MAC PDU for transmission. All triggered ProSe BSRs shall be cancelled when higher layers deconfigure a valid SL-RNTI.

Regarding FIG. 11, ProSe Buffer Status Report (BSR) MAC control element consists of ProSe BSR and ProSe Truncated BSR: one group index field, one LCG ID field and one corresponding Buffer Size field.

The ProSe BSR is identified by MAC PDU subheaders with LCID as specified in Table 1. It has a variable size.

For each included group, the fields are defined as follow (FIG. 11):
  i) Group index: The group index field identifies the target group. The length of this field is 4 bits. ii) R: Reserved bit, set to "0". iii) LCG ID: The Logical Channel Group ID field identifies the group of logical channel(s) which buffer status is being reported. The length of the field is 2 bits; iv) iv) Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission. The size of the RLC and MAC headers are not considered in the buffer size computation. The length of this field is 6 bits.

Meanwhile, the UE reports the buffer status (BS) information to the eNB in order for the eNB to estimate the amount of uplink data buffered in the UE side and allocate the uplink radio resource to a UE in an optimal way.

In dual connectivity or ProSe, the UE can be connected to more than one MAC and each MAC manages the radio resources of the logical channels of which the data are transmitted to a base station. Since each eNB schedules the radio resources according to its own policy and traffic situation, the BS information of the logical channels of which the data are transmitted to the eNB is not useful to the other eNB when the UE is not supporting dual connectivity. However, in dual connectivity, it might be useful for the eNB to know the BS information of the logical channels of which the data are transmitted to the other eNB. For example, one eNB can request addition/removal/modification of the cells to the other eNB considering the buffer status of the logical channels corresponding to the other eNB.

If the UE with dual connectivity reports the BS information of the logical channels of which the data are transmitted to the other eNB as well as to the eNB, the eNB needs to distinguish whether the received BS information is for the eNB or the other eNB. If the logical channel group is identified uniquely within a UE, the UE can generate the BSR MAC CE relying on the legacy method. However, if the logical channel group is identified uniquely within a group of cells, one LCG ID can be used multiple times across the group of cells. For example, LCG ID #1 can be used in the group of cells configured by the Master eNB (MeNB) and in the group of cells configured by the Secondary eNB (SeNB). As a consequence, the UE cannot rely on the legacy method unless there is a method that the eNB can distinguish the LCG ID between different eNBs. Otherwise, the eNB cannot understand the received BS information and cannot estimate how much uplink resources need to be allocated. For convenience, although Dual Connectivity system is described, the present invention is equally/similarly applicable to ProSe, as described above.

FIG. 12 is a conceptual diagram for reporting buffer status according to embodiments of the present invention.

In this invention, if the UE comprise two more MAC entities (i.e. a first MAC entity and a second MAC entity), when the UE reports the buffer status information of the logical channel to an eNB, the UE indicates with which eNB the buffer status is associated.

For this, the UE indicates to which eNB the data of the logical channels of which the buffer status information is reported are transmitted.

Here, 'the eNB associated with the buffer status' means, i) the eNB manages the radio resource for the logical channels of which the buffer status is reported by the UE; or ii) the eNB manages the radio bearer for the logical channels of which the buffer status is reported by the UE; or, iii) the eNB transmits/receives the data through the logical channels of which the buffer status is reported by the UE.

The UE is configured with more than one MAC entities (i.e. a first MAC entity and a second MAC entity (S1201)). In case of this, the two more MAC entities can be connected with two more eNBs respectively (i.g. DC), or the two more MAC entities can be connected with one eNB (i.g. ProSe).

The logical channel group is identified within a MAC entity and LCG ID is uniquely used in a MAC entity. I.e., one LCG ID can be used multiple times across the MAC entities.

For a first MAC entity, if the BSR is triggered and not cancelled, if the UE has UL resources allocated for new transmission for this TTI, the UE generates a MAC PDU including the BSR MAC control element(s) as follows (S1203);

The UE generates the BSR MAC CEs for the first MAC entity by setting the buffer size to the amount of data available across the logical channels that are mapped to the first MAC entity.

When the UE generates the MAC PDU, the UE may select an indication to be included in the MAC PDU subheader corresponding to each BSR MAC CE.

Preferably, the MAC PDU includes an first indicator indicating that the first BSR MAC CE for an amount of data to be transmitted via the first MAC entity.

Preferably, the MAC PDU includes an first indicator indicating that the first BSR MAC CE is for the amount of data to be transmitted via the first MAC entity.

The UE generates the BSR MAC CEs for the second MAC entity by setting the buffer size to the amount of data available across the logical channels that are mapped to the second MAC entity.

Preferably, the MAC PDU includes an second indicator indicating that the second BSR MAC CE for an amount of data to be transmitted via the second MAC entity.

Preferably, the MAC PDU includes an second indicator indicating that the second BSR MAC CE is for the amount of data to be transmitted via the second MAC entity.

After the S1203, the UE can transmit the MAC PDU generated by S1203 via the first MAC entity to a base station (S1205).

Preferably, the amount of data available across the logical channels that are mapped to the second MAC entity can be forwarded from the second MAC entity to the first MAC entity (S1207).

Preferably, for the MAC PDU subheader corresponding to the BSR MAC CE of which the buffer status is associated with the first eNB, the UE selects a LCID value for the BSR of the first eNB.

Preferably, for the MAC PDU subheader corresponding to the BSR MAC CE of which the buffer status is associated with the secondary eNB, the UE selects a LCID value for the BSR of the secondary eNB. In this case the LCID value for the BSR of the secondary eNB can be pre-defined between the UE and the eNBs.

Alternatively, the UE sets the N field in the MAC PDU subheader corresponding to the BSR MAC CE of which the buffer status is associated with the secondary eNB. For example, a B field is set to one if the buffer status in the BSR MAC CE is associated with the secondary eNB.

For example, when the eNB receives the MAC PDU, the eNB checks the MAC PDU subheader, if the LCID value is for the BSR of the secondary eNB, or if the B field is set to one in the MAC PDU subheader, the eNB considers the BS information in the corresponding BSR MAC CE is the amount of the data available across the logical channels of which the data are transmitted to the secondary eNB.

Meanwhile, if the LCID value is for the BSR of the first eNB, or if the B field is set to zero in the MAC PDU subheader, the eNB considers the BS information in the corresponding BSR MAC CE is the amount of the data available across the logical channels of which the data are transmitted to the first eNB.

Similarly, if the UE has one MAC entity and the UE has to provide the eNB with information about the amount of data which is not transmitted to the eNB, the embodiment of FIG. 12 is also applicable in this case.

If the BSR is triggered and not cancelled, the UE generates a first BSR MAC CEs for an amount of data which is transmitted to the eNB and also a second BSR MAC CE for an amount of data which is not transmitted to the eNB.

And the MAC PDU further includes an indicator indicating the first BSR MAC CE for an amount of data to be transmitted to the eNB and an indicator indicating the second BSR MAC CE for an amount of data not to be transmitted to the eNB.

Figure 13:
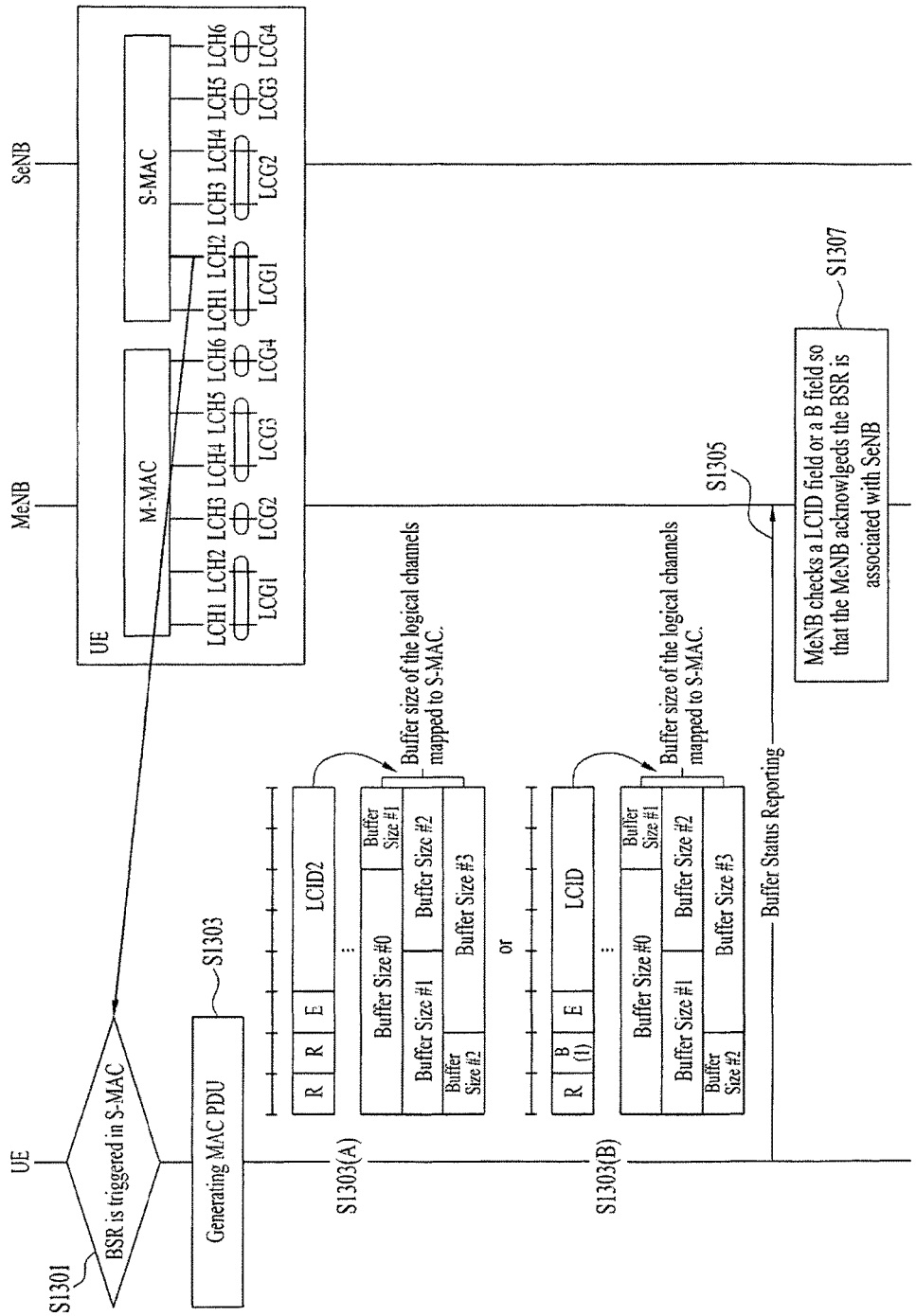
FIGS. 13 to 15. show examples of generating a MAC PDU according to embodiments of the present invention.

FIG. 13 shows an example of generating a MAC PDU according to embodiments of the present invention.

For convenience, although Dual Connectivity system is described, the present invention is equally/similarly applicable to ProSe, as described above.

In the UE side, there are two MAC entities corresponding to two eNBs, respectively: M-MAC for MeNB and S-MAC for SeNB. In this example, the UE reports the Long BSR to the MeNB when the BSR is triggered in S-MAC (S1301). When BSR is triggered and not cancelled in S-MAC, the UE generates a MAC PDU including the BSR MAC CE where the BS information is the amount of the data available for transmission across the logical channels mapped to the S-MAC (S1303). In order for the MeNB to know the buffer status is associated with the SeNB, the UE may use a LCID value pre-defined for the BSR of the secondary eNB (1303A) or the UE may use a B field is set to one (1303B).

The UE may transmit the generated MAC PDU to the MeNB (S1305).

The MeNB received the MAC PDU can checked the LCID field or a B field so that the MeNB acknowledges the BSR is associated with SeNB (S1307).

Figure 14:
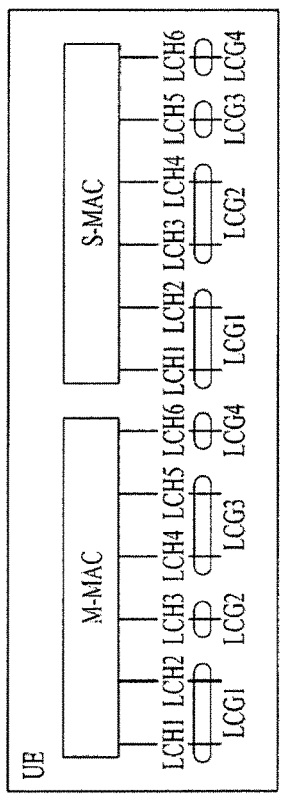
Figure 14:
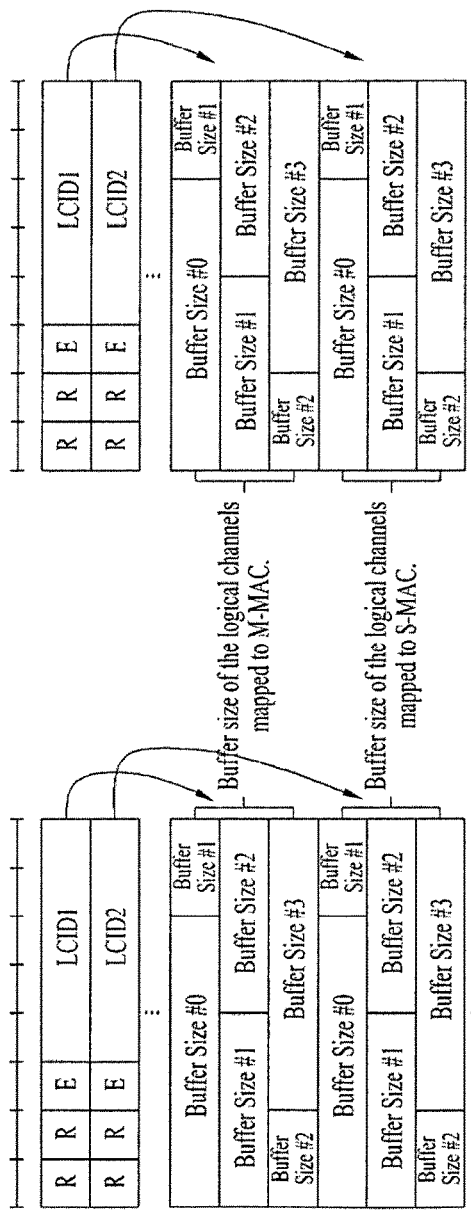

FIG. 14 shows an example of generating a MAC PDU according to embodiments of the present invention.

The generated MAC PDU includes a BSR MAC CE to report long BSR for both eNBs while the UE is connected to two eNBs (MeNB and SeNB).

In this example, the UE reports the Long BSR when the BSR is triggered. When BSR is triggered and not cancelled in M-MAC or S-MAC, the UE generates a MAC PDU including two BSR MAC CEs for M-MAC and S-MAC. In order for the MeNB to know that one BSR MAC CE is for the M-MAC while the other BSR MAC CE is for the S-MAC, the UE sets LCID values to a pre-defined LCID value based on that with which eNB the logical channels of which the buffer size are included in the BSR MAC CE are associated (see figure A). Alternatively, the UE sets the B field in the MAC PDU subheader corresponding to the BSR MAC CE for the S-MAC to one (see figure B). The UE sets the B field to zero for the BSR MAC CE for the M-MAC while the UE sets the B field to one for the BSR MAC CE for the S-MAC.

Figure 15A:
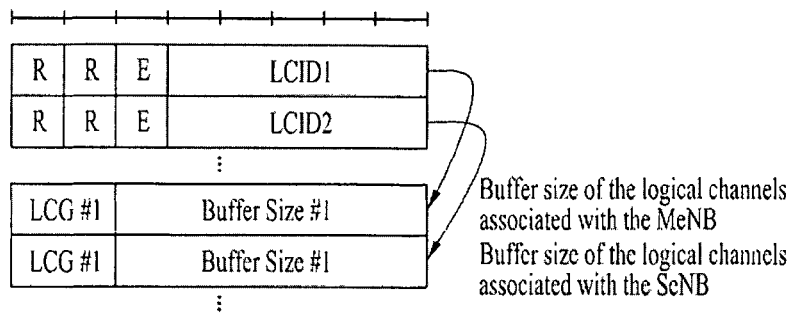
Figure 15B:
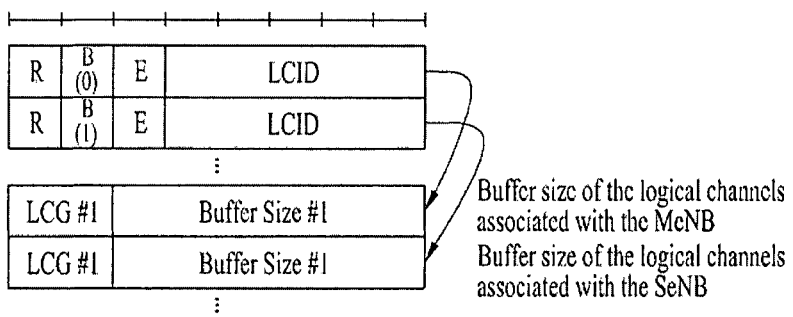

FIG. 15 shows an example of generating a MAC PDU according to embodiments of the present invention.

In this case, the generated MAC PDU includes a BSR MAC CE to report short BSR for both eNBs while the UE is connected to two eNBs (MeNB and SeNB).

FIGS. 13 and 14 are examples of generating a MAC PDU including the BSR MAC CEs for long BSR of different eNBs. While FIG. 15 is an example of generating a MAC PDU including the BSR MAC CEs for short BSR of different eNBs.

The UE generates a MAC PDU including two short BSR MAC CEs for M-MAC and S-MAC. In order for the MeNB to know that one BSR MAC CE is for the M-MAC while the other BSR MAC CE is for the S-MAC, the UE sets LCID values to a pre-defined LCID value based on that with which eNB the logical channels of which the buffer size are included in the BSR MAC CE are associated (see FIG. 15A). Alternatively, the UE sets the B field in the MAC PDU subheader corresponding to the BSR MAC CE for the S-MAC to one (see FIG. 15B). The UE sets the B field to zero for the BSR MAC CE for the M-MAC while the UE sets the B field to one for the BSR MAC CE for the S-MAC.

Figure 16:
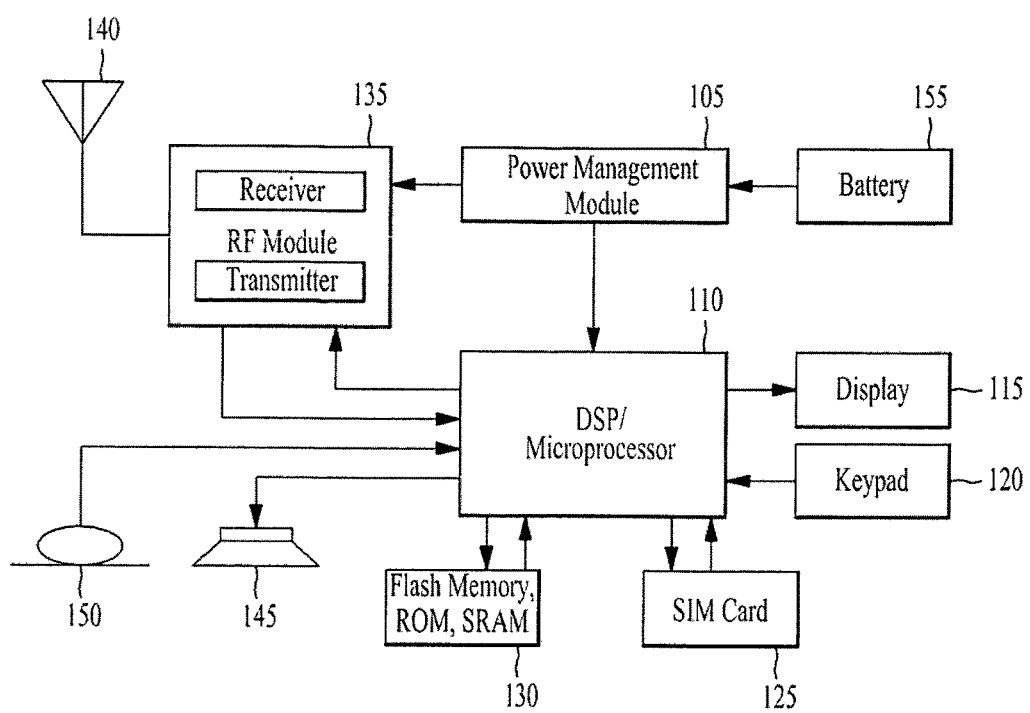
FIG. 16 is a block diagram of a communication apparatus according to an embodiment of the present invention.

The apparatus shown in FIG. 16 can be a user equipment (UE) and/or eNB adapted to perform the above mechanism, but it can be any apparatus for performing the same operation.

As shown in FIG. 16, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 16 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 16 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) transmitting a Medium Access Control Protocol Data Unit (MAC PDU) in a wireless communication system, the method comprising:
generating a first buffer status reporting (BSR) MAC Control Element (CE) for a first BSR including an amount of first data available for transmission to a first BS, when the first BSR is triggered by a first MAC entity;
generating a second BSR MAC CE for a second BSR including an amount of second data available for transmission to a second BS, when the second BSR is triggered by a second MAC entity;
generating the MAC PDU including a subheader of the MAC PDU, the first BSR MAC CE and the second BSR MAC CE; and
transmitting the MAC PDU via the second MAC entity to the first BS,
wherein the first MAC entity and the second MAC entity are configured to the UE, and
wherein the subheader of the MAC PDU includes a first indicator indicating the first BS associated with the first BSR and a second indicator indicating the second BS associated with the second BSR.

2. The method according to claim 1, wherein the first BS associated with the first BSR, manages radio resources for logical channels on which the first BSR is reported by the UE, manages a radio bearer for the logical channels on which the first BSR is reported by the UE, or transmits or receives the first data through the logical channels on which the first BSR is reported by the UE.

3. The method according to claim 1, wherein the second BS associated with the second BSR, manages radio resources for logical channels on which the second BSR is reported by the UE, manages a radio bearer for the logical channels on which the second BSR is reported by the UE, or transmits or receives the second data through the logical channels on which the second BSR is reported by the UE.

4. The method according to claim 1, wherein the first or second indicator is a logical channel identifier (LCID) value in the subheader of the MAC PDU.

5. The method according to claim 1, wherein the first or second indicator is a specific field in the subheader of the MAC PDU.

6. A User Equipment (UE) for transmitting a Medium Access Control Protocol Data Unit (MAC PDU) in a wireless communication system, the UE comprising:
a transmitter; and
a processor, operably coupled with the transmitter, that
generates a first buffer status reporting (BSR) MAC Control Element (CE) for a first BSR including an amount of first data available for transmission to a first BS, when the first BSR is triggered by a first MAC entity;
generates a second BSR MAC CE for a second BSR including an amount of second data available for transmission to a second BS, when the second BSR is triggered by a second MAC entity;
generates the MAC PDU including a subheader of the MAC PDU, the first BSR MAC CE and the second BSR MAC CE,
controls the transmitter to transmit the MAC PDU via the second MAC entity to the first BS,
wherein the first MAC entity and the second MAC entity are configured to the UE, and
wherein the subheader of the MAC PDU includes a first indicator indicating the first BS associated with the first BSR and a second indicator indicating the second BS associated with the second BSR.

7. The UE according to claim 6, wherein the first BS associated with the first BSR, manages radio resource for logical channels on which the first BSR is reported by the UE, manages a radio bearer for the logical channels on which the first BSR is reported by the UE, or transmits or receives the first data through the logical channels on which the first BSR is reported by the UE.

8. The UE according to claim 6, wherein the second BS associated with the second BSR, manages radio resource for logical channels on which the second BSR is reported by the UE, manages a radio bearer for the logical channels on which the second BSR is reported by the UE, or transmits or receives the second data through the logical channels on which the second BSR is reported by the UE.

9. The UE according to claim 6, wherein the first or second indicator is a logical channel identifier (LCID) value in the subheader of the MAC PDU.

10. The method according to claim 6, wherein the first or second indicator is a specific field in the subheader of the MAC PDU.

* * * * *